United States Patent [19]

Davis et al.

[11] 4,401,720

[45] Aug. 30, 1983

[54] POLY(VINYL CHLORIDE) PLASTISOL COMPOSITIONS

[75] Inventors: Donald C. Davis; Richard L. McConnell; Max F. Meyer, Jr., all of Kingsport, Tenn.

[73] Assignee: Eastman Kodak Company, Rochester, N.Y.

[21] Appl. No.: 420,213

[22] Filed: Sep. 20, 1982

Related U.S. Application Data

[63] Continuation of Ser. No. 276,725, Jun. 24, 1981, abandoned.

[51] Int. Cl.[3] ........................ B32B 27/06; B32B 27/36

[52] U.S. Cl. .................................... 428/483; 428/518; 428/480; 156/333; 156/311; 156/321; 156/322; 523/523

[58] Field of Search ....................... 428/483, 518, 480; 156/333, 311, 321, 322; 523/523

[56] References Cited

U.S. PATENT DOCUMENTS

| | | | |
|---|---|---|---|
| 3,549,571 | 12/1970 | Berg et al. | 525/163 |
| 3,723,379 | 3/1973 | Althouse et al. | 525/110 |

*Primary Examiner*—Joseph L. Schofer
*Assistant Examiner*—N. Sarofin
*Attorney, Agent, or Firm*—John F. Stevens; Daniel B. Reece, III

[57] ABSTRACT

Disclosed are plastisol compositions comprising a poly(vinyl chloride) resin, a plasticizer for the resin in an amount sufficient to form a plastisol, and from about 4 to about 20% by weight, based on the weight of the composition, of a saturated, thermoplastic polyester dispersed in the plastisol, the polyester being in particulate form, having a melting point of about 70° to about 200° C., a heat of fusion of about 10 calories per gram or less, and an inherent viscosity of about 0.3 to about 1.0.

12 Claims, No Drawings

POLY(VINYL CHLORIDE) PLASTISOL COMPOSITIONS

This is a continuation of abandoned application Ser. No. 276,725 filed June 24, 1981, abandoned.

TECHNICAL FIELD

The present invention relates to poly(vinyl chloride) plastisol compositions modified with a small amount of polyester powder which are useful as adhesives for laminating substrates, especially fabric and thermoplastic sheet material.

Background Art

Poly(vinyl chloride), (herein sometimes referred to as PVC) plastisols ar used to bond backing fabric such as cotton, polyester/cotton, nylon, and polyester fabrics to PVC sheeting for use in automotive seating fabrics, door panels, and vinyl roofs, as well as in furniture applications, luggage, and ladies handbags to provide improved toughness and tear resistance. However, if a polyester fabric is used as the backing fabric in place of a cotton or a polyester/cotton fabric the bond strength of the polyester fabric is inadequate.

It is known in the art to mix PVC and certain types of polyesters for various reasons. Typical of this art is the blending of an unsaturated polyester with PVC, e.g., U.S. Pat. No. 3,376,246 and Canadian Pat. No. 770,210. Also, as exemplified by U.S. Pat. Nos. 3,718,715 and Re 28,982, it is known to blend PVC with polyester elastomers. British Pat. No. 2,003,420 relates to making articles from uncured PVC plastisol and powdered polyester elastomer. Also of interest are Japanese Pat. No. 52028544 relating to a PVC gasket composition containing sebacis acid polyester plasticizer (mol. wt. 7000–10,000) and trimellitic acid trialkyl ester plasticizer, and Japanese Pat. No. 4044927 which relates to an electrostatic powder coating of 20–80% vinyl chloride resin and 20–80% thermoplastic polyester resin. These patents do not suggest the use of a small amount of the particular thermoplastic saturated polyester described herein as a means to improve the bonding strength of PVC plastisols in fabric-plastic laminations.

DISCLOSURE OF INVENTION

According to the present invention, there are provided adhesive compositions based on poly(vinyl chloride) plastisols containing small amounts of polyester powders. These adhesive compositions comprise (a) a vinyl chloride resin selected from polyvinyl chloride and copolymers prepared from vinyl chloride and up to 30% of another copolymerizable vinyl monomer, (b) a plasticizer for the vinyl chloride resin in an amount sufficient to form a plastisol, and (c) from about 4 to about 20% by weight, based on the weight of the composition, of a saturated, thermoplastic polyester dispersed in the plastisol, the polyester being in particulate form having a size of less than about 50 mesh, a melting point of about 70° to about 200° C., a heat of fusion of about 10 calories per gram or less, and an inherent viscosity of about 0.3 to about 1.0.

The addition of the polyester described herein to PVC plastisols substantially improves the bond strength when polyester fabrics are bonded to themselves or to PVC sheeting using the modified plastisols described herein as the adhesive.

The vinyl chloride polymers which may be used are the resinous products obtained by the polymerization of vinyl chloride in the presence or absence of another copolymerizable vinyl compound. The term "vinyl chloride resin" includes vinyl chloride homopolymers as well as copolymers, such as those formed between vinyl chloride and at least one other copolymerizable vinyl monomer, such as vinyl acetate, vinyl propionate, vinyl butyrate, vinylidene chloride, styrene, methylmethacrylate, and the like. The copolymers useful in the practice of this invention are those prepared from at least 70% of vinyl chloride and up to 30% of other copolymerizable vinyl monomer compound.

Plasticizers for making poly(vinyl chloride) plastisols are well known in the art. Many are commercially available.

Plasticizers may be structurally classified either as monomeric or polymeric. Monomeric plasticizers are simple monoesters or diesters of monobasic and dibasic acids or alcohols. Polymeric plasticizers are complex polyesters of dibasic acids and dihydric alcohols having much higher molecular weights than monomeric ones, ranging from about 800 to 7,000.

The most common types are the phthalates, dibasic acid esters, and polymeric plasticizers. DOP (di-2-ethylhexyl phthalate) is the most widely used general purpose plasticizer. Such general purpose plasticizers provide an even balance of compound properties after fusion and are suited for plastisols because of the good flow properties provided. The most efficient plasticizers for vinyls are dibasic acid esters which provide maximum flexibility over a wide temperature range and also impart good flow properties to plastisols. Polymeric polyesters and relatively high-molecular-weight monomeric plasticizers are used as plasticizers in applications requiring maximum permanence because of their resistance to migration, extraction, and volatilization. Satisfactory plastisol viscosity is obtained by using combinations of polymeric and general purpose plasticizers.

Typical plasticizers include di(2-ethylhexyl)phthalate, di(2-ethyl-4-methylpentyl)phthalate, di-capryl phthalate, di-isodecyl phthalate, di-capryl phthalate, di-isodecyl phthalate, di(2-ethylhexyl)hexahydrophthalate, di(2-ethylhexyl)adipate, di(2-ethylhexyl)sebacate, di(2-ethylhexyl)azelate, monomeric epoxy(2-ethyl-hexylepoxytallate), triethylene glycol dicaprylate, acetyl tributyl citrate, 2,2,4-trimethylpentane-1,3-diol diisobutyrate, polyester of neopentyl glycol and adipic acid (M.W.=1,200–1,300), epoxidized soy bean oil (M.W. approximately 1,000), high boiling (above about 200° C.) liquid mixture of partially hydrogenated terphenyls and iso-octyl palmitate, dioctyl phthalate, mixed phthalate esters containing alcohol moieties having 7 to 11 carbon atoms, diisononyl phthalate, diisooctyl phthalate, dioctyl terephthalate, mixed phthalate esters based on isomeric nonyl alcohols, mixed phthalate esters containing alcohol moieties having 6 to 12 carbon atoms, trioctyl trimellitate, butyl benzyl phthalate, and polymeric plasticizers such as poly(2,2,4-trimethyl-1,3-pentanediol adipate)terminated with the monoisobutyrate acid ester of 2,2,4-trimethyl-1,3-pentanediol, and poly(2,2-dimethyl-1,3-propanediol adipate)terminated with 2-ethylhexanol and the like. Cost considerations as well as desired viscosity and adhesion properties of the system affect the specific plasticizer choice. Where lower viscosity is desired without further plasticizer, for example, for spray coating application, small amounts of a diluent (5–15%) such as toluene, xylene, methyl isoamyl ketone, diisobutyl ketone and the like may be added to form the sprayable organosol.

Mixtures of the above identified plasticizers may be used if desired. Normally, the plasticizer will be present in the plastisol in the amount of about 80 to about 130 parts per hundred parts (pph) of vinyl chloride resin.

Polyesters useful in the practice of this invention generally have melting points in the range of about 70° to about 200° C. and heats of fusion ($\Delta H_f$) of about 10 calories per gram or less. The polyester may have no $\Delta H_f$, i.e., $\Delta H_f = O$ in which case the polymer is amorphous. Preferably the polyesters melt to higher than about 180° C. Generally the polyesters useful in this invention will have inherent viscosities of at least about 0.3 and not greater than about 1.0. In order to obtain good flow properties when the plastisol compositions are used in making bonds, it is desirable that the melt viscosity of the polyester component be no higher than about 500,000 cps at 190° C.

The polyester powders used in this invention will generally have mesh sizes of less than 50 mesh. For example, 50–70 mesh, 70–200 mesh, or powders less than 200 mesh are useful in the practice of this invention. The size powders may thus range between 50 and about 325 mesh.

Some preferred copolyesters are described in U.S. Pat. No. 4,094,721. These copolyesters contain terephthalic acid moieties. These "terephthalic moieties" can be supplied by the usual terephthalic moiety sources, e.g., terephthalic acid, and the mono and dialkyl esters of terephthalic acid. Thus, the term "terephthalic moiety" or "terephthalic acid moiety" is to be considered as including those moieties supplied by the mono or diester. The polyester contains terephthalic acid in an amount of at least 40 mol %, based upon the acid moieties.

If a portion of the terephthalic acid moiety is replaced by a second acid moiety, it is replaced by a saturated aliphatic dicarboxylic acid having terminal carboxylic acid groups having from 4 to about 34 carbon atoms between the two carboxyl groups. Preferably, the saturated aliphatic dicarboxylic acid contains between 4 and 8 carbon atoms between the carboxyl groups. Examples of aliphatic dicarboxylic acids contemplated include adipic, azelaic or sebacic acid or mixtures thereof. Alternatively, 1 to 60 mol % of the terephthalic acid content can be replaced by isophthalic acid. As a third alternative, a portion of the terephthalic acid content can be replaced by an isophthalic acid moiety or a moiety of one or more saturated aliphatic dicarboxylic acids.

The diol component of the copolyesters preferably comprises a mixture of 1,4-butanediol and 1,6-hexanediol where the combined quantities of these diols constitute all of the diol component.

In some cases, one or more additional saturated aliphatic diols having 2 to 12 carbon atoms can be incorporated by condensation in addition to the 1,4-butanediol and 1,6-hexanediol. In such cases, the third diol is present in an amount up to 20 mol % based upon the total diol component. The third diol can also be a branched diol. The hydroxyl groups are preferably attached to the terminal carbon atoms. Examples of diols particularly contemplated include ethylene glycol, propanediol-1,3, pentanediol-1,5 and neopentyl glycol.

With respect to the aliphatic or the named aromatic dicarboxylic acids polyester forming derivatives can be used in the prepration of the polyester, especially the mono or dialkyl esters of the named dicarboxylic acids, especially $C_1$–$C_4$ mono or dialkyl esters, particularly the dimethyl esters.

Other preferred copolyesters include those derived in conventional manner from an acid component including one or more of the following acids-terephthalic, isophthalic, succinic, adipic, 1,4-cyclohexanedicarboxylic and glutaric, and a glycol component including one or more of the following glycols-ethylene glycol, diethylene glycol, and 1,4-cyclohexanedimethanol.

Still other preferred copolyesters are prepared by the condensation polymerization of at least 40 mole percent dimethyl 1,4-cyclohexanedicarboxylate (DMCD) and at least 50 mole % 1,4-butanediol. The acid component may contain up to 60 mol percent of one or more dicarboxylic acid moieties selected from moieties of isophthalic, succinic, adipic and glutaric acid. Up to 50 mole percent of the glycol moieties may be ethylene glycol or diethylene glycol moieties or mixtures thereof. Preferably, the mole percentages are about as follows: DMCD, 65 to 85; other dicarboxylic acid as specified above, 35 to 15; 1,4-butanediol, 65 to 85 and ethylene glycol or diethylene glycol, 35 to 15.

Especially preferred are copolyesters derived from about 75 mole % DMCD, about 25 mole % glutaric acid, about 75 mole % 1,4-butanediol and about 25 mole % diethylene glycol.

The dicarboxylic acids and glycols specified for the copolyester are commercially available or they may be prepared by well known procedures. The copolyesters are prepared by reacting the acid or acids with the glycol or glycols in a conventional manner well known in the art.

Internal fillers may also be incorporated into the plastisol formulations which are used as adhesives. For example, calcium carbonate, carbon black, and other typical fillers may be used as desired. When using calcium carbonate, it is desirable to use material with a 20–50 micron particle size range. Stabilizers in addition to those normally present in PVC plastisol formulations may also be used if desired.

The resinous compositions also may include additives other than plasticizers which are normally incorporated in vinyl resin compositions. Generally such compositions include one or more stabilizers to impart resistance to thermal degradation. Inorganic fillers, either fibrous or non-fibrous, as well as pigments may be used where desirable. In addition other resin additives, such as solvents, diluents, binders and the like may be employed.

The present plasticizers may be incorporated in the vinyl chloride resin, along with or without other additions, by any suitable process such as calendering, mixing or kneading of the ingredients. A desirable procedure involves forming a vinyl resin dispersion which can be cast in a film or thicker body, and then heated to form a homogeneous body of plasticized resin. Such dispersions are suspensions of vinyl chloride resin particles in nonaqueous liquids including the plasticizer which do not dissolve the resin at ordinary temperatures but do at elevated temperatures. If the liquid phase consists only of plasticizer, the dispersion is often termed as "plastisol," whereas if the dispersing liquid also contains volatile components which evaporate upon heating, the dispersion is often termed as "organosol." Both plastisols and organosols may include other additives, including stabilizers, normally used in vinyl chloride resin compositions. The term "plastisol" as used herein is intended to include both plastisols and organosols.

The polyester powders according to this invention may be added at any time and in any convenient manner to the PVC plastisol. If desired, the PVC and polyester may be mixed simulaneously with the plasticizer using, for example, conventional mixing or blending equipment.

The plastisol adhesive according to this invention may be used by applying a coating of the plastisol to at least one of the substrates to be bonded, pressing the substrates together, and heating for a time sufficient to form a bond, usually to a temperature of about 135° C. to 205° C. to cure the plastisol. Alternately, the plastisol may be pre-cured by curing the plastisol in film form, placing it between the substrates to be bonded, and heating to a temperature of about 135° C. to about 205° C. to form the bond.

The following examples are submitted for a better understanding of the invention.

EXAMPLE 1

A poly(vinyl chloride)plastisol consisting of 100 parts of Geon 121 poly(vinyl chloride), 100 parts dioctyl phthalate, and 3 parts of Interstat BC-103 (Ba-Cd-Zn-based stabilizer) is prepared in a Cowles Dissolver after the mixture is deaerated under vacuum. The plastisol is cast into a 3 mil film on a flat glass plate using a doctor blade to draw down the film. The film is cured at 177° C. for 20 minutes in a circulating air oven. T-peel bonds (4×4 inches) of a Lacoste knit 100% polyester fabric are prepared on a Sentinel heat sealer with 1×4 inch strips of the plastisol film placed between the two pieces of fabric along a 4 inch side. Bonding conditions are 177° C. (top and bottom platens), 15 seconds compression time, and 20 psig. After bonding, ½ inch is trimmed from each end of the 4×4 bond and three one-inch T-peel bonds are cut from each specimen. Flexible poly(vinyl chloride) sheeting (13 mils thick) is bonded to the polyester fabric in the same manner as previously described except that the bottom platen next to the PVC sheeting is heated to only 66° C. (top platen at 177° C.) to avoid distortion of the PVC sheeting. These bonds are aged 40 hours at 21° C., 50% relative humidity and tested on an Instron machine at 2 inches/minute crosshead speed. A T-peel bond strength of 0.9 pli is obtained on the fabric to fabric bond (adhesive failure). On the poly(vinyl chloride) sheeting to fabric bond, a T-peel strength of 0.1 pli is obtained.

EXAMPLE 2

The procedure of Example 1 is followed except that 2.4, 4.7, 9.0, and 16.5 wt. % of a fine powder (<200 mesh) of a copolyester containing 80 mol % terephthalic acid, 20 mol % isophthalic acid, 20 mol % 1,4-butanediol, and 80 mol % 1,6-hexanediol (I.V.=0.72; $T_m$=104° C.) I, is incorporated in the poly(vinyl chloride) plastisol mixture before the dispersions are prepared in the Cowles Dissolver. Polyester fabric to fabric and poly(vinyl chloride) to fabric T-peel bonds are made with the polyester powder modified plastisols as previously described and the results are shown in Table 1.

TABLE 1

| Polyester Powder Concentration in PVC Plastisol, Wt. % | | T-Peel Bond Strength, Pli | |
|---|---|---|---|
| | | Fabric to Fabric | PVC Sheeting to Fabric |
| (Control) | 0 | 0.9 (Adhesive Failure) | 0.1 (Adhesive Failure) |
| | 2.4 | 0.9 (Adhesive Failure) | 0.1 (Adhesive Failure) |
| | 4.7 | 1.1 (Adhesive Failure) | 1.1 (Adhesive Failure) |
| | 9.0 | 1.7 (Adhesive Failure) | 1.1 (Adhesive Failure) |
| | 16.5 | 3.9 (Cohesive Failure of Adhesive) | 1.0 (Adhesive Failure) |

The addition of as little as 4.7 wt. % of the poyester powder to the poly(vinyl chloride) plastisol provides a significant (10 fold) increase in the peel strength of the poly(vinyl chloride) sheeting to fabric bonds over that obtained with the unmodified plastisol. With the fabric to fabric bonds, concentrations of 4.7 wt. % or higher of the polyester powder provide significant increases in peel strength and at a concentration of 16.5 wt. % of the powder in the plastisol, the failure mode changes from adhesive to cohesive failure of the adhesive. This example clearly shows the improvement in bond strength obtained by adding the finely divided polyester powder to the poly(vinyl chloride) plastisol.

EXAMPLE 3

Forty-five grams of the preformed poly(vinyl chloride) plastisol prepared in Example 1 is placed in a 100-ml Pyrex round bottom flask with 5 grams of I powder (<200 mesh). The mixture is mechanically stirred for one hour at 23° C. A similar dispersion is also made with I powder having a particle size range of 70–200 mesh. Five mil films are cast from these blends. Bonds are made with these films as described in Example 1 and the results are given in Table 2.

TABLE 2

| Adhesive | T-Peel Bond Strength, Pli | |
|---|---|---|
| | Fabric to Fabric | Poly(vinyl chloride) Sheeting to Fabric |
| Poly(vinyl chloride) Plastisol (Control) | 0.9 | 0.1 |
| Plastisol + 10% I Powder (<200 mesh) | 1.7 | 1.7 |
| Plastisol + 10% I Powder (70–200 mesh) | 2.8 | 1.2 |

This example illustrates that the polyester powder can be added to the preformed plastisol with the same good results obtained by adding the powder to the plastisol during the initial blending step. This example also illustrates that I powder having a particle size range of 70–200 mesh is just as effective as the <200 mesh powder in significantly improving the bonding properties of poly(vinyl chloride) plastisols.

EXAMPLE 4

The procedure of Example 3 is followed except that 45 grams of preformed poly(vinyl chloride) plastisol is blended with 5 grams of a copolyester containing 100 mol % terephthalic acid, 69 mol % ethylene glycol, and 31 mol % of 1,4-cyclohexanedimethanol (I.V.=0.45). Cast films from this blend are used to make fabric to fabric and fabric to poly(vinyl chloride) sheeting bonds. The fabric to fabric bonds have a peel strength of 4.1 pounds per inch. The fabric/poly(vinyl chloride) sheeting bonds have a peel strength of 1.2 pounds per inch.

EXAMPLE 5

The procedure of Example 3 is followed except that 45 grams of preformed plastisol are blended with 5 grams of a copolyester containing 100 mol % terephthalic acid, 63 mol % ethylene glycol, and 37 mol % of diethylene glycol (I.V.=0.64). Films cast from this blend are used to bond fabric to fabric and the laminated fabrics have a peel strength of 1.8 pounds per inch.

EXAMPLE 6

The procedure of Example 3 is followed except that 45 grams of preformed plastisol are blended with 5 grams of a copolyester containing 100 mol % terephthalic acid, 80 mol % 1,6-hexanediol, and 20 mol % 1,4-butanediol (powder size 70–200 mesh; I.V.=0.72; $T_m$=125° C.). Cast films of this blend are used to bond fabric and PVC sheeting. Fabric to fabric bonds have a peel strength of 3.6 pounds per inch and fabric to PVC sheeting bonds have a peel strength of 1.0 pound per inch.

EXAMPLE 7

The procedure of Example 3 is followed except that 45 grams of preformed plastisol are blended with 5 grams of a copolyester containing 75 mol % trans-1,4-cyclohexanedicarboxylic acid, 25 mol % of glutaric acid, 75 mol % of 1,4-butanediol, and 25 mol % of diethylene glycol (powder size 70–200 mesh; I.V.=0.85; $T_m$=104° C.). Fabric to fabric bonds made with cast films of this blend have a peel strength of 3.8 pounds per inch. Fabric/PVC sheeting bonds have a peel strength of 0.7 pounds per inch.

EXAMPLE 8

The procedure of Example 3 is followed except that 45 grams of preformed plastisol are blended with 5 grams of a powder (70–200 mesh) of a copolyester containing 50 mol % terephthalic acid, 50 mol % isophthalic acid, and 100 mol % 1,4-butanediol ($T_m$=125° C.; I.V. 0.62). Fabric to fabric bonds made with cast films of this blend have a peel strength of 5.8 pounds per inch. Fabric/PVC sheeting bonds have a peel strength of 0.9 pounds per inch.

EXAMPLE 9

The procedure of Example 3 is followed except that 45 grams of preformed plastisol are blended with 5 grams of powder (70–200 mesh) of a copolyester containing 70 mol % terephthalic acid, 30 mol % adipic acid, and 100% 1,4-butanediol ($T_m$=180° C.; I.V. 0.54). Fabric to fabric bonds made with cast films of this blend have a peel strength of 6.6 pounds per inch.

EXAMPLE 10

The procedure of Example 3 is followed except that 45 grams of preformed plastisol are blended with 5 grams of powder (70–200 mesh) of a copolyester containing 68 mol % terephthalic acid, 12 mol % isophtahlic acid, 20 mol % of sebacic acid, and 100 mol % of 1,4-buanediol (I.V.=0.52; $T_m$=175° C.). Fabric to fabric bonds made with cast films of this blend have a T-peel strength of 5.2 pounds per inch.

In all the above examples according to this invention, the $\Delta H_f$ of the polyester is less than 10 cal/gm.

Whenever the term "inherent viscosity" (I.V.) is used in this application, it will be understood to refer to viscosity determinations made at 25° C. using 0.25 gram of polymer per 100 ml. of a solvent composed of 60 wt. % phenol and 40 wt. % tetrachloroethane.

The "melting point" ($T_m$) of the polymers described in this application are readily obtained with a Differential Scanning Calorimeter.

The "heat of fusion" $\Delta H_f$ of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in Journal of Applied Polymer Science 20, 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

The strength of the bonds is determined by the so-called "Peel Test" based on a modification (i.e., three test specimens) of the ASTM "T-Peel Test" set forth on pages 63 and 64 of the 1964 edition of the BOOK OF ASTM STANDARDS, published by the American Society for Testing Materials, and more specifically identified as Test Number D-1876-61-T.

Unless othewise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A composition having improved adhesion to polyester and polyvinyl chloride materials comprising (a) a vinyl chloride resin selected from polyvinyl chloride and copolymers prepared from vinyl chloride and up to 30% of another copolymerizable vinyl monomer, (b) a plasticizer for said vinyl chloride resin in an amount sufficient to form a plastisol, and (c) from about 4 to about 20% by weight, based on the weight of said composition, of a saturated, linear thermoplastic polyester derived from about 100 mole % of a dicarboxylic acid and about 100 mole % of a glycol component, said polyester being dispersed in said plastisol, said polyester having a melting point of about 70° to about 200° C., a heat of fusion of about 10 calories per gram or less, and an inherent viscosity of about 0.3 to about 1.0.

2. Composition according to claim 1 wherein the melting temperature of the polyester is between about 70° C. and about 180° C.

3. Composition according to claim 1 wherein the plasticizer is present in an amount between about 80 and about 130 parts per 100 parts poly(vinyl chloride).

4. Composition according to claim 1 wherein said polyester is derived from one or more dibasic acids selected from terephthalic acid, isophthalic acid, succinic acid, 1,4-cyclohexanedicarboxylic acid, adipic acid and glutaric acid, and one or more glycols selected from ethylene glycol, diethylene glycol, 1,4-butanediol, 1,6-hexanediol, and 1,4-cyclohexanedimethanol.

5. Composition according to claim 1 wherein said polyester is derived from 1,4-cyclohexanedicarboxylic acid, glutaric acid, 1,4-butanediol and diethylene glycol.

6. Composition according to claim 1 wherein said polyester is derived from a dibasic acid component comprising at least 40 mole % terephthalic acid, and a glycol component consisting essentially of 1,4-butanediol and 1,6-hexanediol.

7. The method of bonding substrates which comprises applying the composition according to claim 1 between the substrates to be bonded, and applying heat to form a bond.

8. The method of bonding substrates which comprises applying the composition according to claim 5.

9. The method of bonding substrates which comprises applying the composition according to claim 6.

10. Substrates bonded with the composition according to claim 1.

11. Substrates bonded with the composition according to claim 5.

12. Substrates bonded with the composition according to claim 6.

* * * * *

UNITED STATES PATENT AND TRADEMARK OFFICE
CERTIFICATE OF CORRECTION

PATENT NO. : 4,401,720

DATED : August 30, 1983

INVENTOR(S) : Donald C. Davis et al

It is certified that error appears in the above—identified patent and that said Letters Patent is hereby corrected as shown below:

Column 9, line 9, Claim 8, before the period, insert ---between the substrates to be bonded, and applying heat to form a bond---.

Column 10, line 2, Claim 9, before the period, insert ---between the substrates to be bonded, and applying heat to form a bond---.

Signed and Sealed this

*First* Day of *November 1983*

[SEAL]

*Attest:*

GERALD J. MOSSINGHOFF

*Attesting Officer* *Commissioner of Patents and Trademarks*